United States Patent
Makita et al.

(10) Patent No.: US 6,483,320 B1
(45) Date of Patent: Nov. 19, 2002

(54) PORTABLE-TYPE MEASURING INSTRUMENT

(75) Inventors: Satoshi Makita; Takashi Sakamoto; Eiji Miyashita, all of Atsugi; Yutaka Honda, Sagamihara, all of (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/830,210

(22) PCT Filed: Sep. 6, 2000

(86) PCT No.: PCT/JP00/06028

§ 371 (c)(1),
(2), (4) Date: Apr. 23, 2001

(87) PCT Pub. No.: WO01/18495

PCT Pub. Date: Mar. 15, 2001

(30) Foreign Application Priority Data

Sep. 8, 1999 (JP) .......................................... 11-254244

(51) Int. Cl.⁷ .............................................. G01R 31/02
(52) U.S. Cl. ...................................... 324/555; 324/753
(58) Field of Search ................................ 324/555, 753, 324/304; 341/34, 35; 702/127

(56) References Cited

U.S. PATENT DOCUMENTS 5,220,499 A * 6/1993 Kawamori .................. 702/127
6,229,456 B1 * 5/2001 Engholm et al. ............. 341/34

FOREIGN PATENT DOCUMENTS

EP 0 079 086 5/1983
JP 63-201527 8/1988

* cited by examiner

*Primary Examiner*—N. Le
*Assistant Examiner*—Vincent Q. Nguyen
(74) *Attorney, Agent, or Firm*—Frishauf, Holtz, Goodman & Chick, P.C.

(57) ABSTRACT

A portable-type measuring apparatus has an operation unit, a measuring device, a display, an interface, a CPU, a memory, and a case. The operation unit inputs an instruction for measurement. The display displays a measurement result. The interface receives or outputs data from/to an external device. The memory stores a program to control the operation unit, the measuring device, the display, and the interface by the CPU. The case accommodates the operation unit, the measuring device, the display, the interface, the memory and the CPU. The case includes a common unit and a measuring unit and has a fixing member for fixing the common unit and the measuring unit together, The common unit has the operation unit, the display, the interface, and the CPU. The measuring unit has the measuring device and the memory.

7 Claims, 4 Drawing Sheets

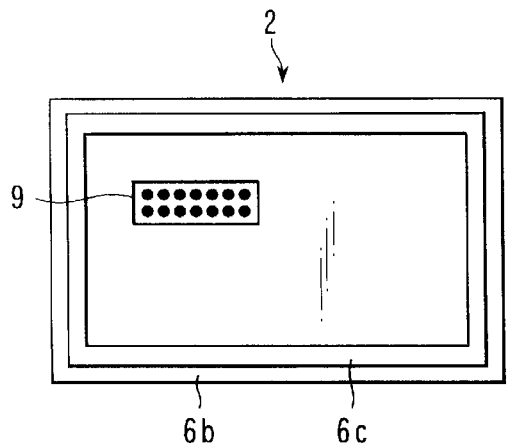
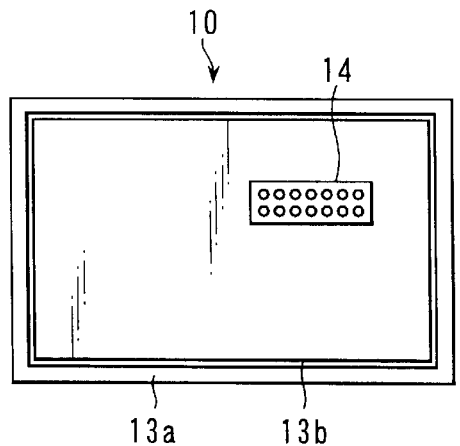
FIG. 3A
FIG. 3B
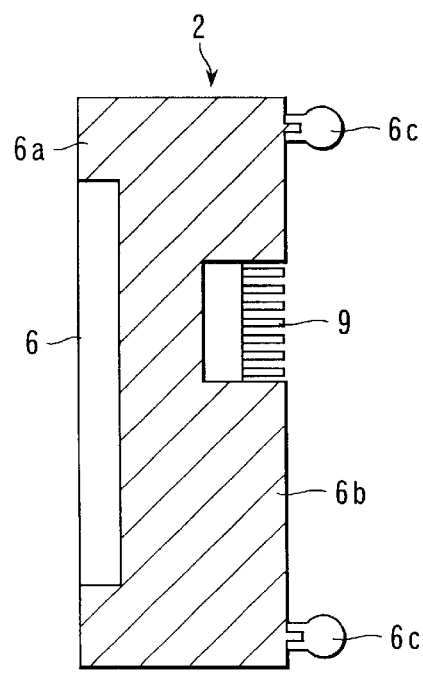
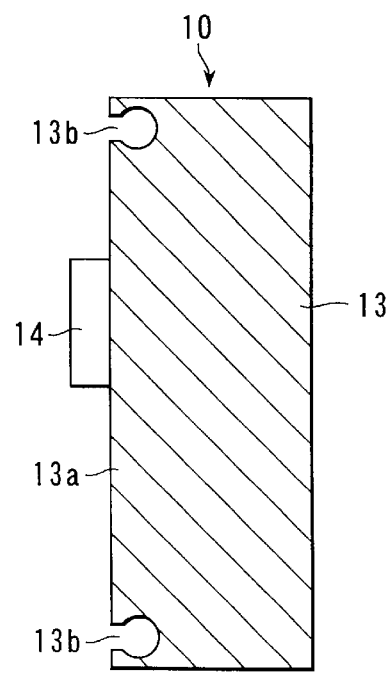
FIG. 3C
FIG. 3D

PORTABLE-TYPE MEASURING INSTRUMENT

This application is a U.S. National Phase Application under 35 USC 371 of International Application PCT/JP00/06028 (not published in English) filed Sept. 6, 2000.

TECHNICAL FIELD

The present invention relates to a portable-type measuring apparatus, and more particularly, it relates to a portable-type measuring apparatus in which one desired measuring unit selected from a plurality of measuring units having unique measuring functions is used so as to be incorporated with a common unit common to the measuring units, and which is constructed so that it is unnecessary to rewrite a memory for storing a program for measurement.

BACKGROUND ART

FIG. 4 is a schematic diagram of a portable-type measuring apparatus 50 constructed by incorporating a conventional common unit 51 with a measuring unit 57.

A display unit 52, an operation unit 53, a memory 54, an interface for an external device (not shown), and a CPU 55 are provided for the common unit 51.

On the other hand, on the measuring means 57, hardware such as an optical time domain reflectometer (hereinbelow, referred to as an OTDR), an optical spectrum analyzer, or the like is mounted.

Accordingly, when the loss or the like of an optical fiber is measured, a measuring unit 57a for the OTDR is inserted into a slot 56 of the common unit 51 to perform the measurement.

When an optical spectrum analysis or the like is performed, a measuring unit 57b for the optical spectrum analyzer is inserted into the slot 56 of the common unit 51 to perform the measurement.

However, the exclusive-use memory 54, for example, a memory in which a program for measurement of the OTDR has been stored is previously installed in the common unit 51.

Accordingly, in the case where the optical spectrum analysis or the like is subsequently performed, even when the measuring unit 57b for the optical spectrum analyzer is inserted into the slot 56 of the common unit 51, the optical spectrum analyzer is not constructed because the program stored in the memory 54 on the common unit 51 side is different from that for the analysis.

Therefore, the contents of the memory 54 have to be rewritten to the program for the optical spectrum analyzer.

DISCLOSURE OF INVENTION

It is an object of the present invention to provide a portable-type measuring apparatus in which, to eliminate the above drawback, a CPU for controlling measuring means, an operation unit, a display unit, and an interface unit is provided for a common unit, and a memory for storing a program to control the measuring means, the operation unit, the display unit, and the interface unit by the CPU is provided for a measuring unit to provide a program according to a measuring function on the measuring unit side, so that measurements by various functions can be performed by merely exchanging the measuring unit without rewriting the program.

Another object of the present invention is to provide a portable-type measuring apparatus in which the periphery of a first cross section is matched to that of a second cross section, the cross sections being obtained by dividing a case into two parts, to connect a first connector and a second connector, so that a connected case can be made compact, and its portability can be improved.

According to a first aspect of the present invention, there is provided a portable-type measuring apparatus comprising:

an operation unit (5) for inputting an instruction for measurement;

measuring means (11) for performing measurement specific to itself;

a display unit (6) for displaying a measurement result;

an interface unit (7) for receiving or outputting data from/to an external device;

a CPU (8) for controlling the operation unit, the measuring unit, the display unit, and the interface unit;

a memory (12) for storing a program to control the operation unit, the measuring means, the display unit, and the interface unit by the CPU; and a case for accommodating the operation unit, the measuring unit, the display unit, the interface unit, the memory, and the CPU, wherein the case can be separated into a common unit (2) and a measuring unit (10) and has fixing means for fixing the common unit and the measuring unit, the common unit comprises the operation unit, the display unit, the interface unit, and the CPU, the measuring unit comprises the measuring means and the memory, the CPU arranged on the common unit side transmits or receives data and a control signal to/from the memory and the measuring means arranged on the measuring unit side, and the measuring means can perform the specific measurement according to the contents of the memory.

BRIEF DESCRIPTION OF DRAWINGS

FIG. 3A is a view of the rear surface of a common unit of the portable-type measuring apparatus according to the present invention.

FIG. 3B is a view of the rear surface of a measuring unit of the portable-type measuring apparatus according to the present invention.

FIG. 3C is a cross-sectional view of an essential part of the common-unit of the portable-type measuring apparatus according to the invention.

FIG. 3D is cross-sectional view of an essential part of the measuring unit of the portable-type measuring apparatus according to the invention.

BEST MODE FOR CARRYING OUT OF THE INVENTION

The general outline of the present invention will now be described.

Briefly speaking, there is provided a portable-type measuring apparatus of the present invention, comprising: an operation unit for inputting an instruction for measurement; measuring means for performing measurement specific to itself; a display unit for displaying a measurement result; an interface unit for receiving or outputting data from/to an external device; a CPU for controlling the operation unit, the measuring unit, the display unit, and the interface unit; a memory for storing a program to control the operation unit, the measuring means, the display unit, and the interface unit by the CPU; and a case for accommodating the operation unit, the measuring unit, the display unit, the interface unit, the memory, and the CPU, wherein the case can be separated into a common unit and a measuring unit, the contour of a first cross section existing on the separated portion of the common unit is the same as that of a second cross section existing on the separated portion of the measuring unit, the common unit has the operation unit, the display unit, the interface unit, and the CPU, and a first connector for transmitting or receiving data and a control signal between the CPU, the memory and the measuring means, the first connector is exposed on the first cross section, the measuring unit has the measuring means, the memory and a second connector which is fitted to the first connector, the second connector is exposed on the second cross section, fixing means for matching the first cross section to the second cross section to fix the common unit and measuring unit and for ensuring the fitting of the first and second connectors is included, and the specific measurement according to the contents of the memory is performed.

The second cross section is set opposite to the first cross section.

The periphery of the first cross section is matched to that of the second cross section to connect the first and second connectors.

A power supply is turned on to perform measurement according to the measuring means.

When another measurement is performed, the power supply is turned off and the case is separated into the common unit and the measuring unit.

A common unit for accommodating measuring means having another measuring function is similarly connected to the common unit.

Subsequently, an embodiment of the present invention based on the above-mentioned outline will now be described with reference to the drawings.

FIGS. 1 and 3A to 3D are diagrams for explaining the embodiment of a portable-type measuring apparatus according to the invention.

Figure 1:
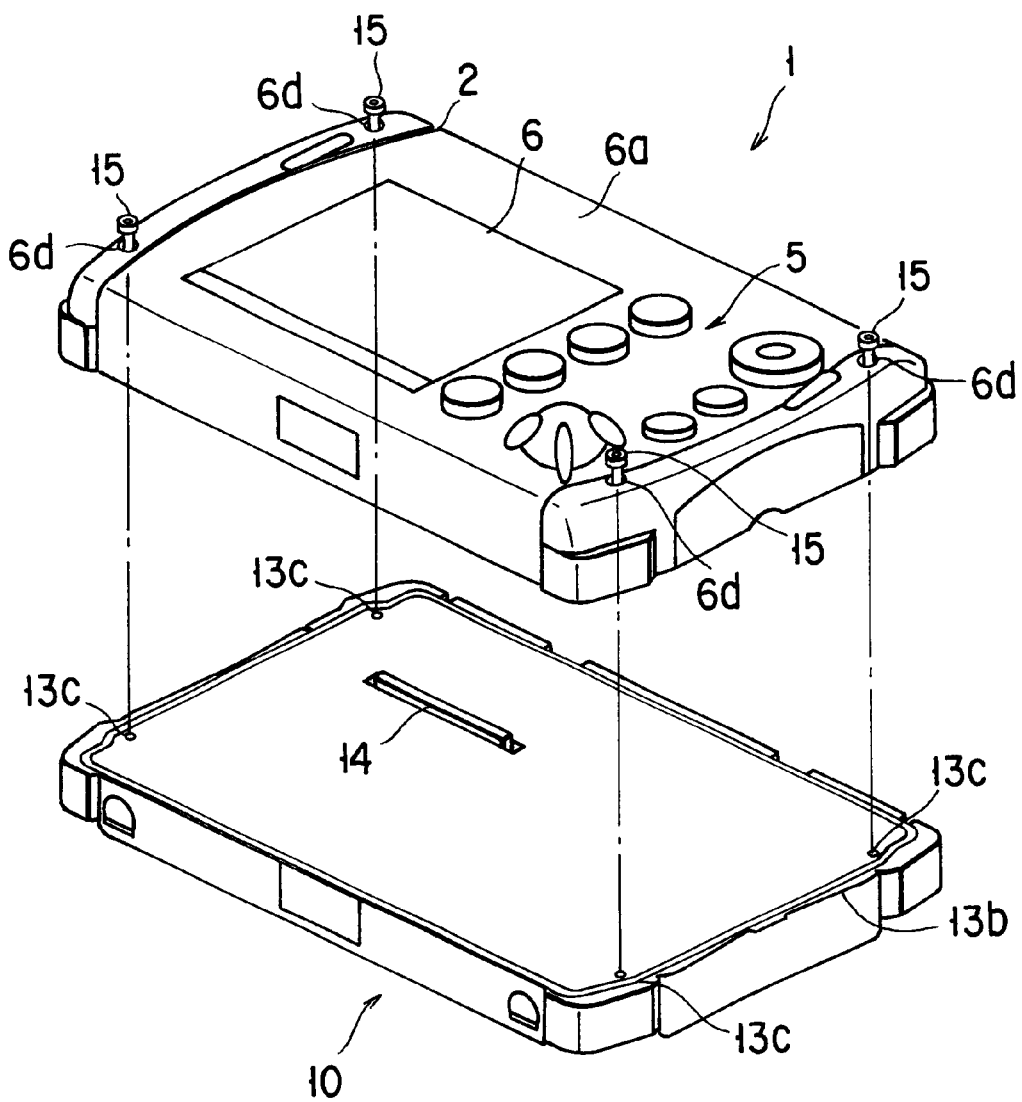
FIG. 1 is a schematic perspective exploded view showing the appearance of a portable-type measuring apparatus of an embodiment according to the present invention.

As shown in FIG. 1, a portable-type measuring apparatus 1 is constituted of a common unit 2 and measuring units 10, the units being obtained by dividing a single case into two parts.

The present embodiment will be explained with respect to a case of using a measuring unit for the OTDR.

Figure 2:
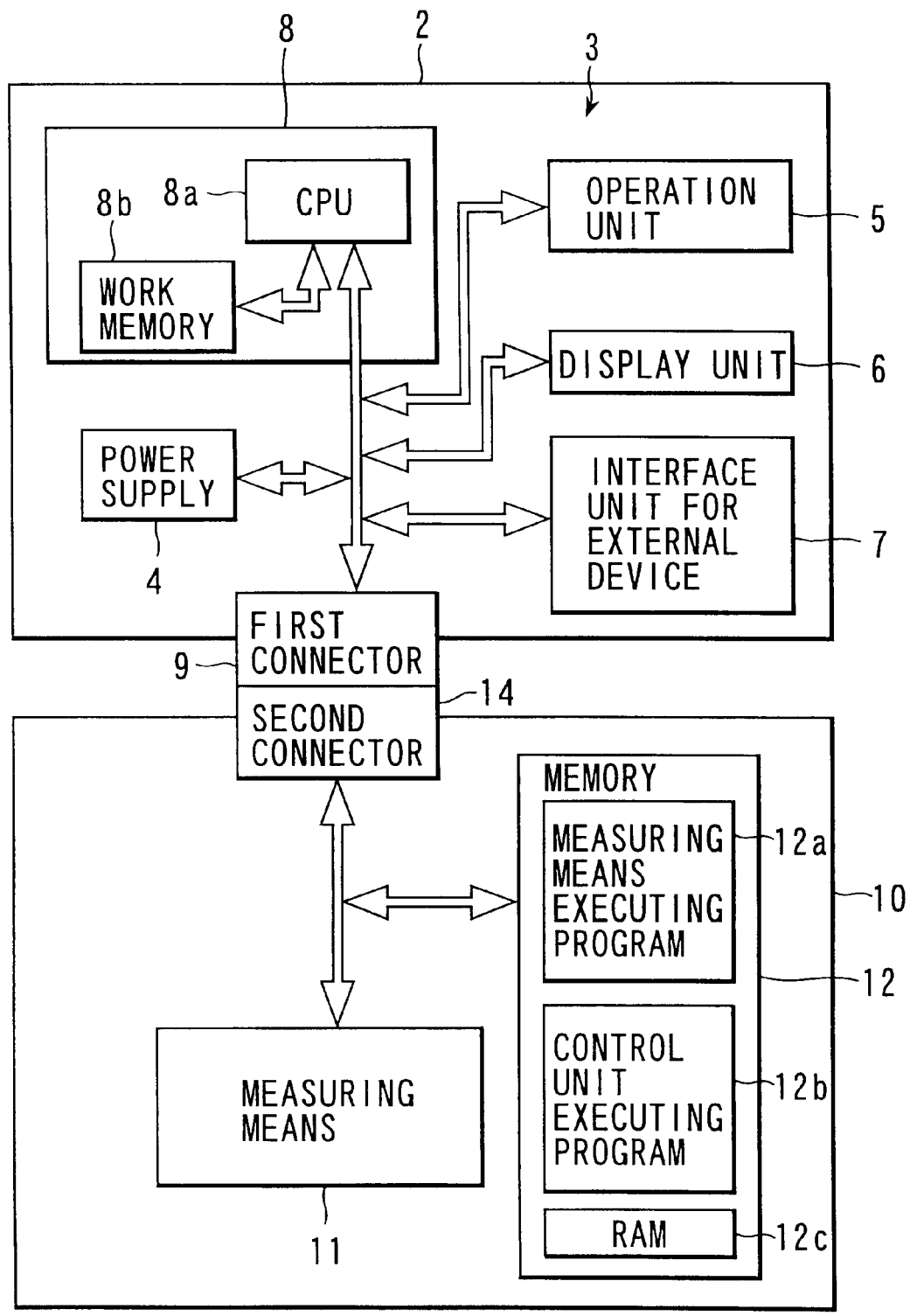
FIG. 2 is a block diagram showing the constitution of the portable-type measuring apparatus of the embodiment according to the invention.
Figure 4:
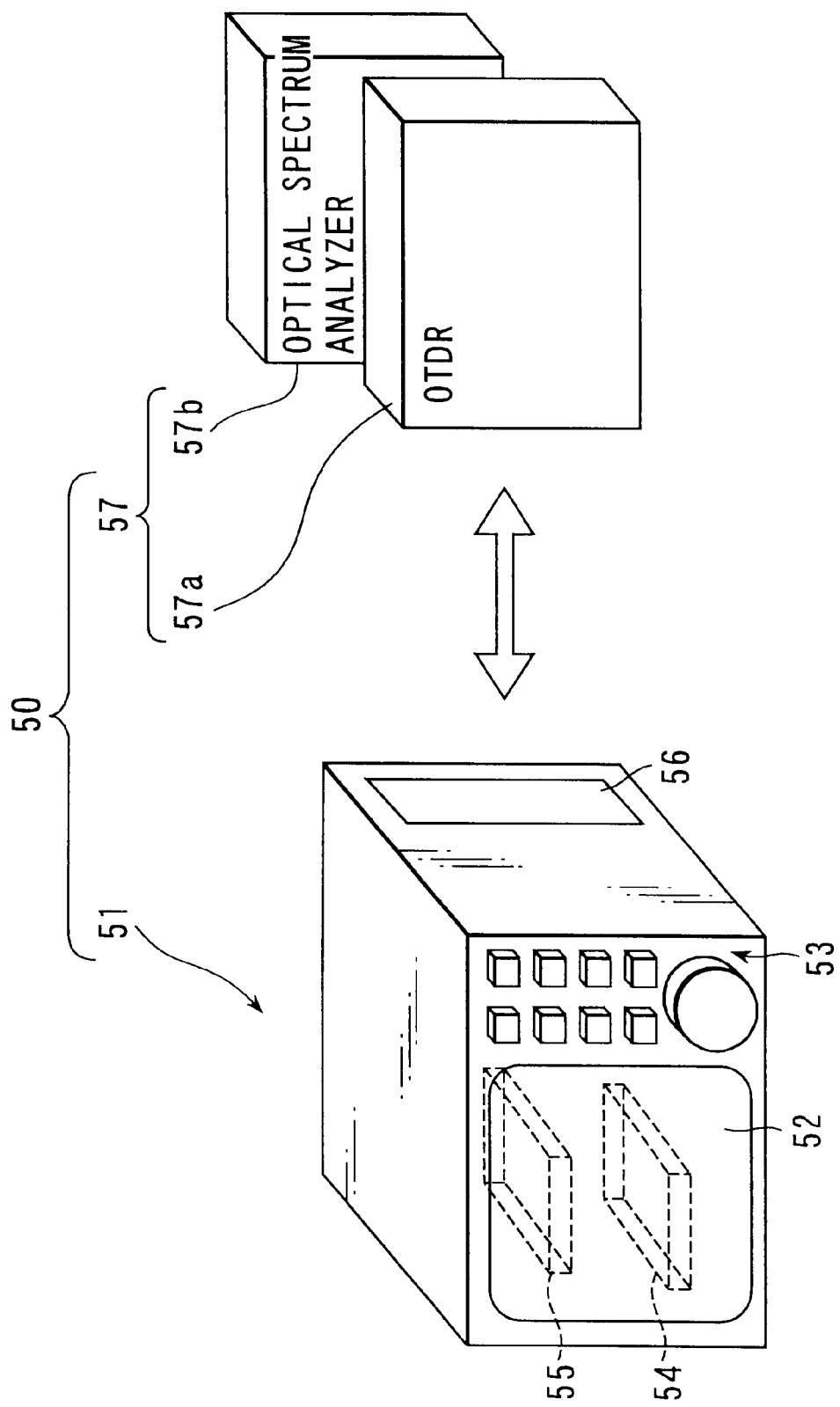
FIG. 4 is a schematic perspective view shown to explain the using state of a conventional portable-type measuring apparatus.

When the common unit 2 is coupled to each of various kinds of measuring units 10, as shown in FIG. 2, the common unit 2 has common means 3 which is used for each of the measuring units 10.

The common means 3 comprises a power supply 4, an operation unit 5, a display unit 6, an interface unit 7 for external devices, and a control unit 8.

The operation unit 5 is a key switch, an encoder, or the like for inputting an instruction for measurement.

The display unit 6 is a flat panel such as an LCD or the like for displaying a measurement result according to the measuring function from the control unit 8.

The external device interface unit 7 is a part for receiving or outputting data from/to an external device such as a keyboard, a mouse, a printer, or the like.

The control unit 8 comprises a CPU 8a and a work memory 8b and controls the operation unit 5, a measuring means 11, which will be described later, the display unit 6, and the external device interface unit 7.

The control unit 8, the operation unit 5, the display unit 6, and the external device interface unit 7 are mutually connected by a bus.

As shown in FIGS. 1 and 3A, the contour of the common unit 2 is a substantially rectangular solid.

As shown in FIG. 1, the length of a display surface 6a in each of the lateral and longitudinal directions, which the display unit 6 is provided thereon, is larger than that in the direction in thickness.

As shown in FIG. 3C, the rear surface of the display surface 6a serves as a first cross section 6b separated from the single case state.

On the first cross section 6b, a first connector 9 is exposed.

As shown in FIG. 2, the first connector 9 is connected to the control unit 8, the operation unit 5, the measuring means 11, the display unit 6, and the external device interface unit 7 through the bus.

As shown in FIG. 3C, frame-shaped packing 6c made of rubber is provided on the periphery of the first cross section 6b.

As shown in FIG. 2, the measuring means 11 for the OTDR and a memory 12 in which a program specific to the OTDR has been stored are provided for the measuring unit 10 for the OTDR.

The measuring means 11 for the OTDR comprises: a measurement terminal to which an optical fiber to be measured is connected; a directional coupler; a light-emitting unit; a light-receiving unit; an amplifying unit; an A/D converter; an addition circuit unit; and a timing-generating unit (which are not shown).

The light-emitting unit supplies light having a predetermined wavelength to the optical fiber to be measured via the directional coupler.

The light-receiving unit receives reflected light from the optical fiber to be measured, which is obtained from the light supplied from the light-emitting unit, for example, back-scattering light and Fresnel reflected light via the foregoing directional coupler.

The amplifying unit amplifies the reflected light from the above light-receiving unit.

The A/D converter samples output signals (analog signals) from the amplifying unit.

Various data sampled by the A/D converter is supplied to the addition circuit unit.

The timing-generating unit outputs signals for providing timing of each of the above light-emitting unit, A/D converter, and addition circuit unit.

The memory 12 as a storage unit, in which the program specific to the OTDR has been stored, comprises: a measuring unit executing program 12a for performing measurement according to the measuring function of the measuring unit 11 for the OTDR on the basis of an instruction from the control unit 8; a control unit executing program 12b for allowing the control unit 8 to execute an arithmetic processing specific to the OTDR on the basis of measurement data obtained by the measurement; and an RAM 12c for storing and holding the measurement data.

As shown in FIG. 1, the measuring unit 10 for the OTDR is shaped into a substantially rectangular solid similar to the common unit 2.

As shown in FIG. 3D, the length in each of the longitudinal and lateral directions of the rear surface 13 is equivalent to that of the display surface and is larger than the length in the direction in thickness.

As shown in FIG. 3B, on the rear side of the rear surface 13, a second cross section 13a is formed.

The first and second cross sections 6b and 13a are identical to each other in contour.

A second connector 14 is exposed on the second cross section 13a.

The second connector 14 is disposed on such a position that it is opposite to the first connector 9 when the first cross section 6b faces the cross section 13a.

The second connector 14 is connected to the measuring means 11 for the OTDR and the memory 12 via the bus.

As shown in FIG. 3D, the periphery of the second cross section 13a has the same size and form as those of the periphery of the first cross section 6b. Along the periphery of the second cross section 13a, a groove 13b to which the packing 6c is fitted is formed in a frame form.

As shown in FIG. 1, screw grooves 6d and 13c are formed in the direction in thickness on the corners of the first cross section 6b and the second cross section 13a.

When the first cross section 6b faces the second cross section 13a, each screw groove 6d of the first cross section 6b communicates with each screw groove 13c of the second cross section 13a. The common unit 2 and the OTDR measuring unit 10 are screwed up so as to be fixed to each other by screws 15.

Next, the operation of the present embodiment will now be described.

First, the first cross section 6b of the common unit 2 is made to face the second cross section 13a of the measuring unit 10.

At that time, the first connector 9 faces the second connector 14.

The packing 6c formed on the periphery of the first cross section 6a is fitted to the groove 13b formed on the periphery of the second cross section 13a, and the first connector 9 is coupled to the second connector 14.

Consequently, the first cross section 6b is come into absolute contact with the second cross section 13a to form the single portable OTDR.

At the measuring time, an optical fiber to be measured is connected to the measurement terminal on the measuring unit 10 side, the printer, mouse, keyboard, and the like are connected to the external device interface unit 7 on the common unit 2 side, and the power supply 4 provided on the common unit 10 side is turned on.

Due to an input from the operation unit 5, a measuring instruction is outputted from the CPU 8a to control the OTDR measuring means 11 in accordance with a procedure of the measuring means executing program 12a.

When loss data of the optical fiber is measured, the measurement data is stored and held in the RAM 12c.

The measurement data stored and held in the RAM 12c is subjected to the arithmetic processing on the work memory 8b of the control unit 8 in accordance with the control unit executing program 12b to obtain measurement data such as the length of the optical fiber, loss of the optical fiber, and the like.

The measurement data is outputted to the display unit 6 or the external device interface unit 7 in response to an instruction of the CPU 8a by the input of the operation unit 5.

When the measurement is finished, the power supply 4 is turned off and the measured optical fiber, printer, mouse, keyboard, and the like are disconnected.

The screws 15 are unscrewed to separate the common unit 2 and the measuring unit 10.

After that, when the use of the optical spectrum analyzer is desired, the measuring unit for the optical spectrum analyzer, which has the same cross section as that of the above-mentioned OTDR measuring unit 10, is connected to the common unit 2.

When the use of a field intensity measuring device is desired, a measuring unit for the field intensity measuring device is connected to it.

As for the first cross section 6b and the second cross section 13a, it is sufficient that at least those contours are identical to match the peripheries to each other. They are not limited to the cross sections as shown in the above-mentioned embodiment.

According to the present invention, since the CPU for controlling the measuring means, the operation unit, the display unit, and the interface unit is provided for the common unit and the memory for storing the program to control the measuring unit, the operation unit, the display unit, and the interface unit by the CPU is provided for the measuring unit, the measuring unit has the program according to the measuring function. Therefore, it is possible to provide the portable-type measuring apparatus which can perform measurements due to different functions without rewriting the program by exchanging the measuring units.

According to the portable-type measuring apparatus of the present invention, the periphery of the first cross section is matched to that of the second cross section to connect the first connector and the second connector, so that a connected case can be made compact, and its portability can be improved.

What is claimed is:

1. A portable-type measuring apparatus comprising:

an operation unit for inputting an instruction for measurement;

measuring means for performing a specific measurement;

a display unit for displaying a measurement result;

an interface unit for receiving or outputting data from/to an external device;

a CPU for controlling the operation unit, the measuring means, the display unit, and the interface unit;

a memory for storing a program to control the operation unit, the measuring means, the display unit, and the interface unit by the CPU; and a case for accommodating the operation unit, the measuring is means, the display unit, the interface unit, the memory and the CPU, wherein:

the case is separated into a common unit and a measuring unit and has fixing means for fixing the common unit and the measuring unit together, the common unit comprises the operation unit, the display unit, the interface unit, and the CPU, the measuring unit comprises the measuring means and the memory, the CPU arranged on the common unit side transmits or receives data and a control signal to/from the memory and the measuring means arranged on the measuring unit side, and the measuring means performs the specific measurement according to the contents of the memory.

2. A portable-type measuring apparatus according to claim 1, wherein:

the common unit has a first cross section on a separated portion thereof, the measuring unit has a second cross section on a separated portion thereof, and the fixing means makes the first cross section and the second cross section face each other to fix the common unit and the measuring unit together.

3. A portable-type measuring apparatus according to claim 2, wherein:

the common unit comprises the operation unit, the display unit, the interface unit, the CPU, and a first connector for transmitting or receiving data and a control signal between the CPU, the memory and the measuring means, and the measuring unit comprises the measuring means, the memory, and a second connector which is fitted to the first connector on the common unit side.

4. A portable-type measuring apparatus according to claim 3, wherein:

the fixing means makes the first cross section and the second cross section face each other to fix the common unit and measuring unit together, and ensures the fitting of the first connector and the second connector.

5. A portable-type measuring apparatus according to claim 2, wherein the contour of the first cross section existing on the separated portion of the common unit is identical with that of the second cross section existing on the separated portion of the measuring unit.

6. A portable-type measuring apparatus according to claim 5, wherein:

the common unit comprises the operation unit, the display unit, the interface unit, the CPU, and a first connector for transmitting or receiving data and a control signal between the CPU, the memory and the measuring unit, and the first connector is exposed on the first cross section; and the measuring unit comprises the measuring means, the memory, and a second connector which is fitted to the first connector on the common unit side, and the second connector is exposed on the second cross section.

7. A portable-type measuring means according to claim 6, wherein the first cross section is matched to the second cross section to fix the common unit and the measuring unit together, and the fitting of the first connector and the second connector is ensured.

* * * * *